US012789287B2

(12) United States Patent
Kumazawa et al.

(10) Patent No.: US 12,789,287 B2
(45) Date of Patent: Nov. 10, 2026

(54) CUTTING DEVICE AND CUTTING METHOD

(71) Applicants: Panasonic Holdings Corporation, Osaka (JP); Sanyo Electric Co., Ltd., Osaka (JP); TOYOTA JIDOSHA KABUSHIKI KAISHA, Aichi-ken (JP)

(72) Inventors: Seiji Kumazawa, Hyogo (JP); Hideki Matsui, Hyogo (JP); Hiroyuki Tajima, Hyogo (JP); Sadahiro Hattori, Kanagawa (JP); Shinji Kojima, Nagoya (JP)

(73) Assignees: PANASONIC HOLDINGS CORPORATION, Osaka (JP); PANASONIC ENERGY CO., LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1068 days.

(21) Appl. No.: 17/911,005

(22) PCT Filed: Mar. 10, 2021

(86) PCT No.: PCT/JP2021/009540

§ 371 (c)(1),
(2) Date: Sep. 12, 2022

(87) PCT Pub. No.: WO2021/182515

PCT Pub. Date: Sep. 16, 2021

(65) Prior Publication Data

US 2023/0088137 A1 Mar. 23, 2023

(30) Foreign Application Priority Data

Mar. 11, 2020 (JP) ................................. 2020-041883

(51) Int. Cl.
*B23K 26/0622* (2014.01)
*B23K 26/082* (2014.01)
(Continued)

(52) U.S. Cl.
CPC ........ *B23K 26/0622* (2015.10); *B23K 26/082* (2015.10); *B23K 26/38* (2013.01); *H01M 4/04* (2013.01)

(58) Field of Classification Search
CPC ... B23K 26/0622; B23K 26/082; B23K 26/38
(Continued)

(56) References Cited

U.S. PATENT DOCUMENTS 9,818,989 B2 11/2017 Cho et al.
2014/0014633 A1 * 1/2014 Chen ...................... B23K 37/00 219/121.67
(Continued)

FOREIGN PATENT DOCUMENTS

CN 108788490 A 11/2018
JP 2014210277 A * 11/2014 ............. B23K 26/14
(Continued)

OTHER PUBLICATIONS

International Search Report issued in corresponding International Application No. PCT/JP2021/009540, dated Apr. 27, 2021, with English translation.

*Primary Examiner* — Elizabeth M Kerr
*Assistant Examiner* — Alba T Rosario-Aponte
(74) *Attorney, Agent, or Firm* — WHDA, LLP

(57) ABSTRACT

A cutting device includes: a conveyance unit that conveys a continuous body of a plurality of electrode plates; a laser scanning unit that scans the continuous body with laser light; and a control unit that controls the laser scanning unit. The control unit controls a laser scanning unit so as to scan the continuous body while performing intermit irradiation with laser light, thereby forming a plurality of unit cutting sections that are continuous and dividing the continuous body into a first portion and a second portion. The unit cutting sections have a main line section extending along the
(Continued)

boundary of the first portion and the second portion, and a bent section that bends and extends from an end of the main line section.

1 Claim, 3 Drawing Sheets

(51) Int. Cl.
*B23K 26/38* (2014.01)
*H01M 4/04* (2006.01)

(58) Field of Classification Search
USPC ........................................ 219/121.67, 121.72
See application file for complete search history.

(56) References Cited

U.S. PATENT DOCUMENTS

| | | | | |
|---|---|---|---|---|
| 2016/0036009 | A1* | 2/2016 | Cho | B23K 26/244 219/121.72 |
| 2016/0263705 | A1* | 9/2016 | Kim | B23K 26/042 |
| 2018/0079035 | A1 | 3/2018 | Watanabe | |
| 2018/0304410 | A1* | 10/2018 | Watanabe | B23K 26/0604 |

FOREIGN PATENT DOCUMENTS

| | | | |
|---|---|---|---|
| JP | 2016-033912 | A | 3/2016 |
| JP | 2016-74007 | A | 5/2016 |

* cited by examiner

CUTTING DEVICE AND CUTTING METHOD

CROSS-REFERENCE TO RELATED APPLICATIONS

This application is the U.S. National Phase under 35 U.S.C. § 371 of International Patent Application No. PCT/JP2021/009540, filed on Mar. 10, 2021, which in turn claims the benefit of Japanese Patent Application No. 2020-041883, filed on Mar. 11, 2020, the entire content of each of which is incorporated herein by reference.

BACKGROUND

Field of the Invention

The present disclosure relates to cutting devices and cutting methods.

Description of the Related Art

In recent years, shipments of in-vehicle secondary batteries have been increasing with the spread of electric vehicles (EV), hybrid vehicles (HV), plug-in hybrid vehicles (PHV), and the like. In particular, shipments of lithium-ion secondary batteries are increasing. Further, secondary batteries are becoming widespread not only for in-vehicle use but also as a power source for portable terminals such as laptop computers. Regarding such secondary batteries, for example, Patent Literature 1 discloses performing a cutting process on an electrode plate to be cut with laser light while continuously conveying the electrode plate using a roll-to-roll process.

Patent Literature 1: Japanese Patent Application Publication No. 2016-33912

Methods for cutting electrode plates includes a so-called one-stroke method where an electrode plate is continuously scanned with laser light and cut in a continuous cutting section and a so-called on-the-fly method where an electrode plate is intermittently scanned with laser light and cut in multiple units cutting sections (cutting segments) connected together.

The one-stroke method allows for the cutting of an electrode plate without fail. However, there is a problem that laser light output conditions are highly dependent on the conveyance speed. For example, when the conveyance speed of an electrode plate is low, the amount of heat input to the electrode plate becomes excessive, which may cause scorching of the electrode plate. Therefore, in the one-stroke method, the intensity of laser light needs to be finely adjusted according to the conveyance speed of an electrode plate, which makes a laser light output control program very complicated and difficult to make.

In contrast, the on-the-fly method allows laser light output control to be simplified. However, there is a problem in the on-the-fly method that the cutting quality depends highly on the conveyance speed. For example, if the conveyance speed of an electrode plate is high, it becomes difficult to connect multiple unit cut sections, and burrs may occur at positions where the cut sections become discontinuous. Burrs on the electrode plate can cause a short circuit, leading to degradation in the quality of the secondary battery. In particular, in recent years, there is a need for improvement in production lead time and throughput of secondary batteries, and there has been a trend toward increased conveyance speed for electrode plates. As a result, the cutting quality of electrode plates is more likely to deteriorate.

SUMMARY OF THE INVENTION

In this background, a purpose of the present disclosure is to provide a technique for suppressing the degradation of cutting quality when cutting electrode plates.

One embodiment of the present disclosure relates to a cutting device. This cutting device includes: a conveyance unit that conveys a continuous body of a plurality of electrode plates; a laser scanning unit that scans the continuous body with laser light; and a control unit that controls the laser scanning unit. The control unit controls the laser scanning unit so as to scan the continuous body while performing intermit irradiation with laser light, thereby forming a plurality of unit cutting sections that are continuous and dividing the continuous body into a first portion and a second portion. The unit cutting sections have a main line section extending along the boundary of the first portion and the second portion, and a bent section that bends and extends from an end of the main line section.

Another embodiment of the present disclosure relates to a cutting method. This cutting method includes: conveying a continuous body of a plurality of electrode plates; and scanning the continuous body while performing intermit irradiation with laser light, thereby forming a plurality of unit cutting sections that are continuous and dividing the continuous body into a first portion and a second portion. The unit cutting sections have a main line section extending along the boundary of the first portion and the second portion, and a bent section that bends and extends from an end of the main line section.

Optional combinations of the aforementioned constituting elements, and implementations of the present disclosure in the form of methods, apparatuses, and systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
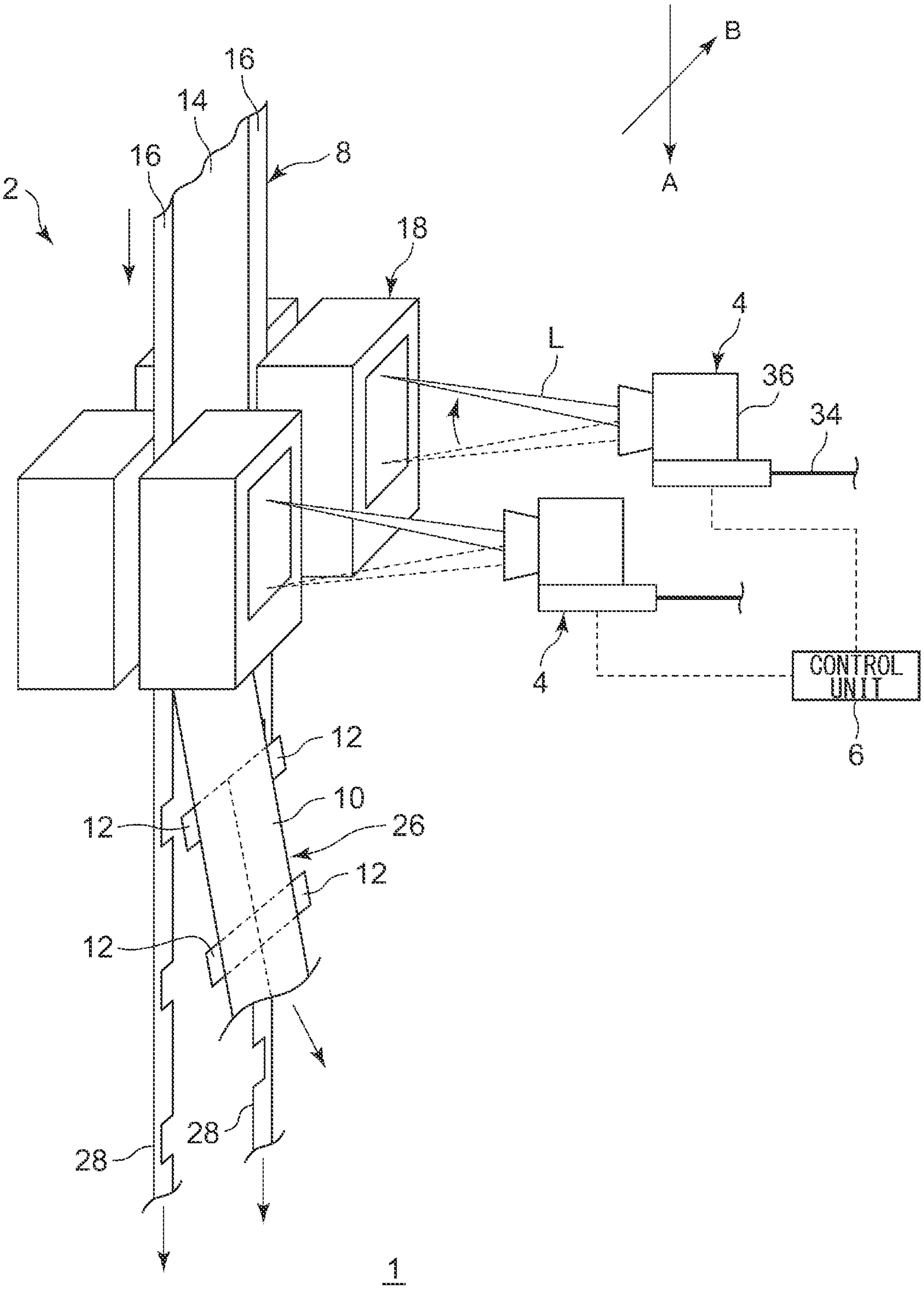
FIG. 1 is a perspective view schematically showing a cutting device according to the first embodiment.

Hereinafter, the present disclosure will be described based on a preferred embodiment with reference to the figures. Further, the embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

First Embodiment

FIG. 1 is a perspective view schematically showing a cutting device according to the first embodiment. A cutting device 1 includes a conveyance unit 2, a laser scanning unit 4, and a control unit 6. The conveyance unit 2 is a mechanism that conveys a continuous body 8. The conveyance speed is, for example, 1 m/min to 100 m/min. The laser scanning unit 4 is a mechanism that scans the continuous body 8 with laser light L and performs a cutting process on the continuous body 8. The control unit 6 is a mechanism that controls the laser scanning unit 4. In the present embodiment, the direction in which the continuous body 8 moves along at a position where the continuous body 8 is cut by the laser scanning unit 4 is a conveyance direction A of the continuous body 8. For example, the conveyance direction A is a vertically downward direction.

The continuous body 8 in the present embodiment is a strip-shaped member that is long in the conveyance direction A and has a structure where a plurality of electrode plates 10 are connected together. For example, the continuous body 8 has a structure in which the electrode plates 10 are arranged in two rows and multiple columns. Each electrode plate 10 has a structure in which an electrode active material layer is stacked on a current collector plate. In the case of a standard lithium-ion secondary battery, the current collector plate is composed of aluminum foil or the like for a positive electrode and copper foil or the like for a negative electrode. Further, in the case of a standard lithium-ion secondary battery, the electrode active material is lithium cobalt oxide, lithium iron phosphate, or the like for a positive electrode and graphite or the like for a negative electrode. In a state after a cutting process by the laser scanning unit 4 is applied to the continuous body 8, a tab 12 is provided to each electrode plate 10. The tab 12 protrudes from the current collector plate of the electrode plate 10 in the width direction B of the continuous body 8. The width direction B is a direction orthogonal to the conveyance direction A.

The continuous body 8 has an electrode active material coated part 14 and electrode active material uncoated parts 16. The electrode active material coated part 14 is arranged in the central part of the continuous body 8 in the width direction B. The coated part 14 corresponds to an electrode active material layer. The coated part 14 can be obtained by applying an electrode slurry containing an electrode active material to the surface of a plate material constituting the current collector plate using a known coating device. The electrode active material uncoated parts 16 are arranged at respective ends of the continuous body 8 in the width direction B. The electrode active material uncoated parts 16 are parts of the plate material constituting the current collector plate that are exposed and that form tabs 12 through the cutting process performed by the laser scanning unit 4. The boundary between the coated part 14 and each uncoated part 16 may be provided with, for example, an oxide layer or the like for protecting the coated part 14. This oxide layer is preferably provided on an electrode plate 10 constituting the positive electrode.

The conveyance unit 2 continuously conveys the continuous body 8 to a position facing the laser scanning unit 4 using feed rolls that are not shown. The cutting device 1 according to the present embodiment is provided with two laser scanning units 4 aligned in the width direction B. One of the laser scanning units 4 irradiates an uncoated part 16 on one end side of the continuous body 8 being conveyed with laser light L. The other laser scanning units 4 irradiates an uncoated part 16 on the other end side of the continuous body 8 being conveyed with laser light L. As a result, the cutting process is performed on the uncoated parts 16 on the respective sides, which forms tabs 12. If the continuous body 8 is an array of negative electrode plates, part of the coated part 14 can also be cut during the cutting process performed by the laser scanning unit 4. If the continuous body 8 is an array of positive electrode plates, a protective layer (not shown) is provided at the boundary between the coated part 14 and an uncoated part 16. The protective layer is, for example, an oxide layer of a metal that constitutes the current collector plate. In this case, part of the protective layer in addition to the uncoated part 16 can also be cut during the cutting process performed by the laser scanning unit 4. Alternatively, part of the coated part 14 and part of the protective layer can also be cut in addition to the uncoated part 16.

The conveyance unit 2 has a chamber 18. The chamber 18 prevents spatter and fumes produced by the cutting process with laser light L from adhering to the continuous body 8 and the cutting device 1 or floating in the atmosphere. The chamber 18 can also be omitted.

The continuous body 8 that has undergone the cutting process by the laser scanning unit 4 is divided into a product part 26 and a waste part 28. The product part 26 includes a plurality of continuous electrode plates 10 and a plurality of tabs 12 composed of a portion of the uncoated part 16. Each tab 12 is provided one-to-one to each electrode plate 10. The waste part 28 is a portion of the uncoated part 16 that does not remain as a tab 12 on the product part 26 side. The product part 26 is conveyed to a subsequent process line. The waste part 28 is conveyed in a different direction from the product part 26 and is separated from the product part 26.

The laser scanning unit 4 has a laser oscillator 34 and a scanning mechanism 36. For the laser oscillator 34, a known fiber laser or the like can be employed. The laser oscillator 34 may be a pulse laser oscillator. Laser light L enters the scanning mechanism 36 from the laser oscillator 34. The scanning mechanism 36 can employ any known scanning mechanism, for example, a galvanometer scanner can be used. The scanning mechanism 36 has a mirror (not shown) supported rotatably by two motors with axes in two directions and can rotate the mirror in the X-axis direction and the Y-axis direction so as to perform scanning on an XY plane with the laser light L. The scanning mechanism 36 is not limited to such a 2D scanner and may be a 3D scanner with additional scanning in the focal (Z-axis) direction. In this case, scanning in the Z-axis direction is realized by moving a collimator lens in the Z-axis direction. The scanning mechanism 36 can radiate laser light L toward the continuous body 8 and displace the radiation direction of the laser light L by rotationally moving the mirror. The driving of the laser oscillator 34 and the driving of the scanning mechanism 36 are controlled by the control unit 6.

The control unit 6 is implemented in hardware such as elements or circuits such as a CPU and memory of a computer, and in software such as a computer program. FIG.

1 depicts functional blocks implemented by the cooperation of the hardware and the software. Therefore, it will be obvious to those skilled in the art that the functional blocks may be implemented in a variety of manners by a combination of hardware and software.

Figures 2A, 2B, 2C:
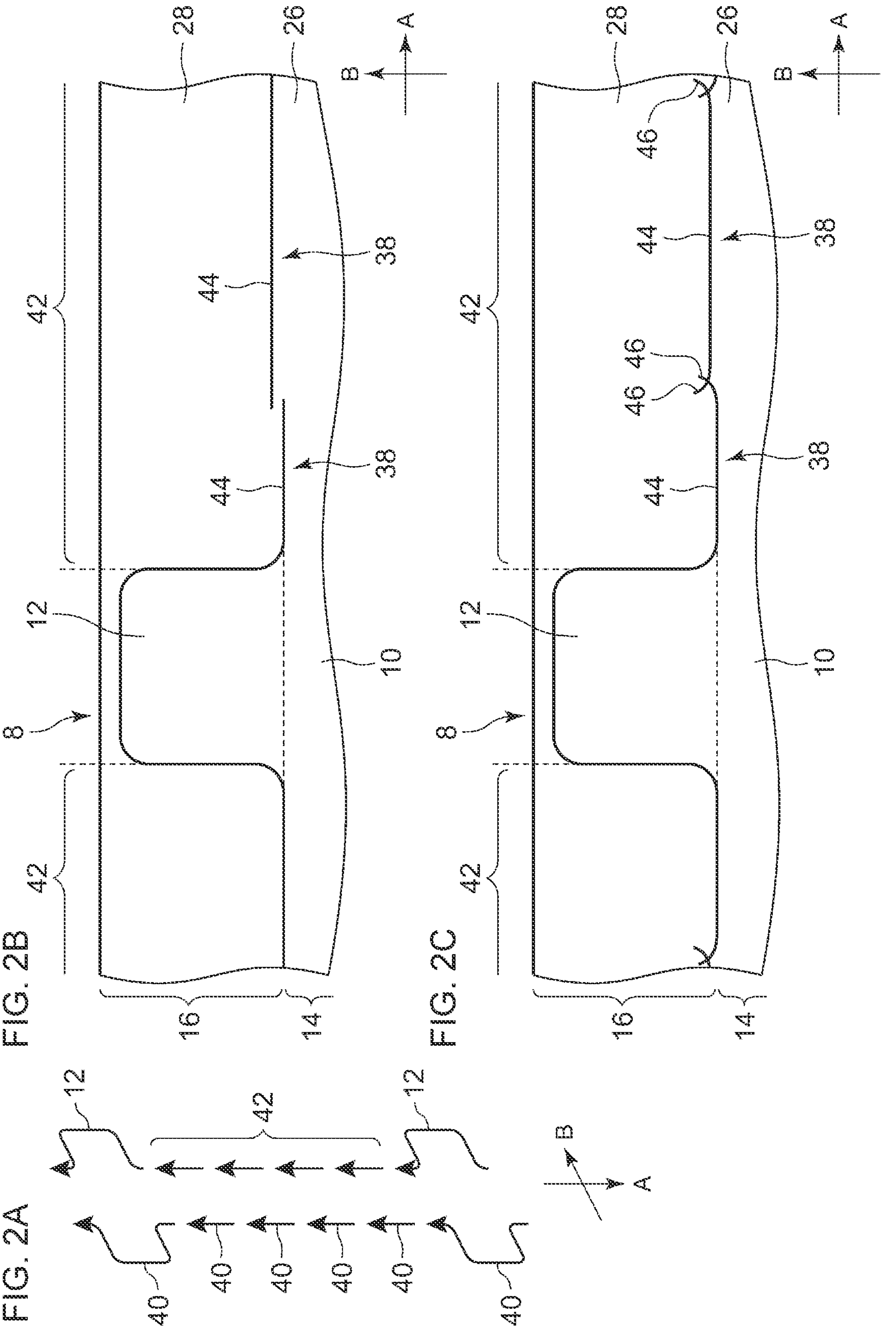
FIG. 2A is a schematic diagram showing the trajectory of laser light.
FIG. 2B is a schematic diagram showing the shape of unit cutting sections in a reference example.
FIG. 2C is a schematic diagram showing the shape of unit cutting sections in the first embodiment.

FIG. 2A is a schematic diagram showing the trajectory of laser light L. FIG. 2B is a schematic diagram showing the shape of unit cutting sections in a reference example. FIG. 2C is a schematic diagram showing the shape of unit cutting sections in the first embodiment.

The control unit 6 controls the laser scanning unit 4 so as to scan the continuous body 8 while performing intermit irradiation with laser light L, thereby forming a plurality of unit cutting sections 38 that are continuous and dividing the continuous body 8 into a first portion and a second portion. In other words, the control unit 6 controls the laser scanning unit 4 so as to apply the cutting process to the continuous body 8 in the on-the-fly method.

The laser scanning unit 4 aligns a position for irradiation with laser light L with a predetermined irradiation start point on the continuous body 8 in each irradiation division in the intermittent irradiation with laser light L and starts scanning the continuous body 8 with laser light L. The laser scanning unit 4 rotates the mirror of the scanning mechanism 36 to displace the position for irradiation with laser light L toward the upstream side in the conveyance direction A. When the position for irradiation with laser light L reaches a predetermined irradiation end point, the laser scanning unit 4 stops the irradiation with the laser light L. This forms a single unit cutting section 38.

Since the conveyance of the continuous body 8 continues, the formed unit cutting section 38 moves along on the downstream side in the conveyance direction A. The laser scanning unit 4 brings the position for irradiation with laser light L back to the irradiation start point at a speed faster than the conveyance speed of the continuous body 8. Thereafter, when the upstream side end of the unit cutting section 38 in the conveyance direction that is formed in the previous irradiation division, that is, the irradiation end position for laser light L in the previous irradiation division reaches the irradiation start point, the laser scanning unit 4 starts irradiation with laser light L in the subsequent irradiation division. The control unit 6 can learn that the irradiation end position in the previous irradiation division has reached the irradiation start point based on the conveyance speed of the continuous body 8 and the elapsed time.

Repeating the above operation causes the trajectory 40 of fragmentary laser lights L, in other words, unit cutting sections 38 to be continuous and the continuous body 8 to be cut into a product part 26 as the first portion and a waste part 28 as the second portion, as shown in FIG. 2A. In a portion of the continuous body 8 corresponding to a tab 12, a trajectory 40 curving outward in the width direction B is drawn along the contour of the tab 12. This forms a tab 12 protruding in the width direction B from an electrode plate 10. Each tab 12 is formed by one trajectory 40 (unit cutting section 38). In the continuous body 8, a plurality of linear trajectories 40 are drawn at a portion corresponding to a connection region 42 connecting two adjacent tabs 12 in the conveyance direction A. Thereby, a plurality of linear unit cutting sections 38 are joined together to form a linear connection region 42. The connection region 42 extends parallel to the conveyance direction A.

As in a reference example shown in FIG. 2B, in the case where each unit cutting section 38 is formed only by a main line part 44 extending along the boundary between the product part 26 and the waste part 28, when adjacent unit cutting sections 38 are displaced in the width direction B, the unit cutting sections 38 may become discontinuous. In contrast, as shown in FIG. 2C, a unit cutting section 38 according to the present embodiment has a main line section 44 extending along the boundary between a product part 26 and a waste part 28 and a bent section 46 that bends and extends from an end of the main line section 44. Each bent section 46 extends from an end of the main line section 44 outward in the width direction B. Thereby, even if adjacent unit cut sections 38 are misaligned in the width direction B, the bent sections 46 of the respective unit cutting sections 38 can intersect each other. As a result, the adjacent unit cutting sections 38 can become continuous.

For example, in the linear unit cutting section 38 forming the connection region 42, the main line section 44 is linear extending parallel with respect to the conveyance direction A. The bent section 46 extends from both ends of this main line section 44 in a direction intersecting a direction in which the main line section 44 extends, that is, in a direction intersecting the conveyance direction A. In a curved unit cutting section 38 forming a tab 12, a main line section 44 has a curved portion protruding in the width direction B and a linear portion located at an edge of the curvature and extending parallel to the conveyance direction A. This linear portion constitutes part of the connection region 42. The bent section 46 extends from an end of the linear portion of the main line section 44 in a direction intersecting the conveyance direction A. The bent section 46 may be linear or curved.

A tab 12 is formed by cutting the uncoated part 16. Further, a connection region 42 shown in FIG. 2C is formed by cutting the uncoated part 16. However, the location where a connection region 42 is provided is not limited to the uncoated part 16. When the continuous body 8 is an array of negative electrode plates, the connection region 42 may be formed by cutting an end of the coated part 14 in the width direction B. In other words, the unit cutting section 38 forming the connection region 42 may be arranged in the coated part 14. In this case, at least the main line section 44 of the unit cutting section 38 is arranged in the coated part 14. Also, when the continuous body 8 is an array of positive electrode plates, the connection region 42 may be formed by cutting the protective layer or by cutting an end of the coated part 14 in the width direction B. In other words, the unit cutting section 38 forming the connection region 42 may be arranged in protective layer or the coated part 14. In this case, at least the main line section 44 of the unit cutting section 38 is arranged in the protective layer or the coated part 14.

As explained above, the cutting device 1 according to the present embodiment includes: a conveyance unit 2 that conveys a continuous body 8 of a plurality of electrode plates 10; a laser scanning unit 4 that scans the continuous body 8 with laser light L; and a control unit 6 that controls the laser scanning unit 4. The control unit 6 controls the laser scanning unit 4 so as to scan the continuous body 8 while performing intermit irradiation with laser light L, thereby forming a plurality of unit cutting sections 38 that are continuous and dividing the continuous body 8 into a first portion and a second portion. Each unit cutting section 38 has a main line section 44 that extends along the boundary of the first portion and the second portion and a bent section 46 that bends and extends from an end of the main line section 44.

Even when two adjacent unit cutting sections 38 are misaligned in a direction intersecting the direction of the adjacence, providing bent sections 46 to the unit cutting sections 38 allows the two unit cutting sections 38 to be continuous by causing the respective bent sections 46 to intersect each other. This allows the generation of burrs in the cutting sections of the first and second portions to be suppressed, and thus the degradation of cutting quality of electrode plates can be suppressed. Therefore, the production lead time and throughput can be improved while maintaining the quality of the secondary battery.

Further, the continuous body 8 according to the present embodiment has a strip shape that is long in the conveyance direction A and has an electrode active material coated part 14 provided in the center of the continuous body 8 in the width direction B orthogonal to the conveyance direction A and an electrode active material uncoated part 16 arranged at an end of the continuous body 8 in the width direction B. The control unit 6 controls the laser scanning unit 4 such that at least the uncoated part 16 is cut to form a plurality of tabs 12 arranged at predetermined intervals in the conveyance direction A. At least part of the bent section 46 extends outward in the width direction B. This can prevent the end of the electrode plate 10 from being cut off by the bent section 46.

Second Embodiment

The second embodiment shares a common structure with the first embodiment except that a tab 12 is formed by a plurality of unit cutting sections 38. Hereinafter, an explanation will be given mainly on structures different from those of the first embodiment, and the common structure will be briefly described or omitted.

Figure 3:
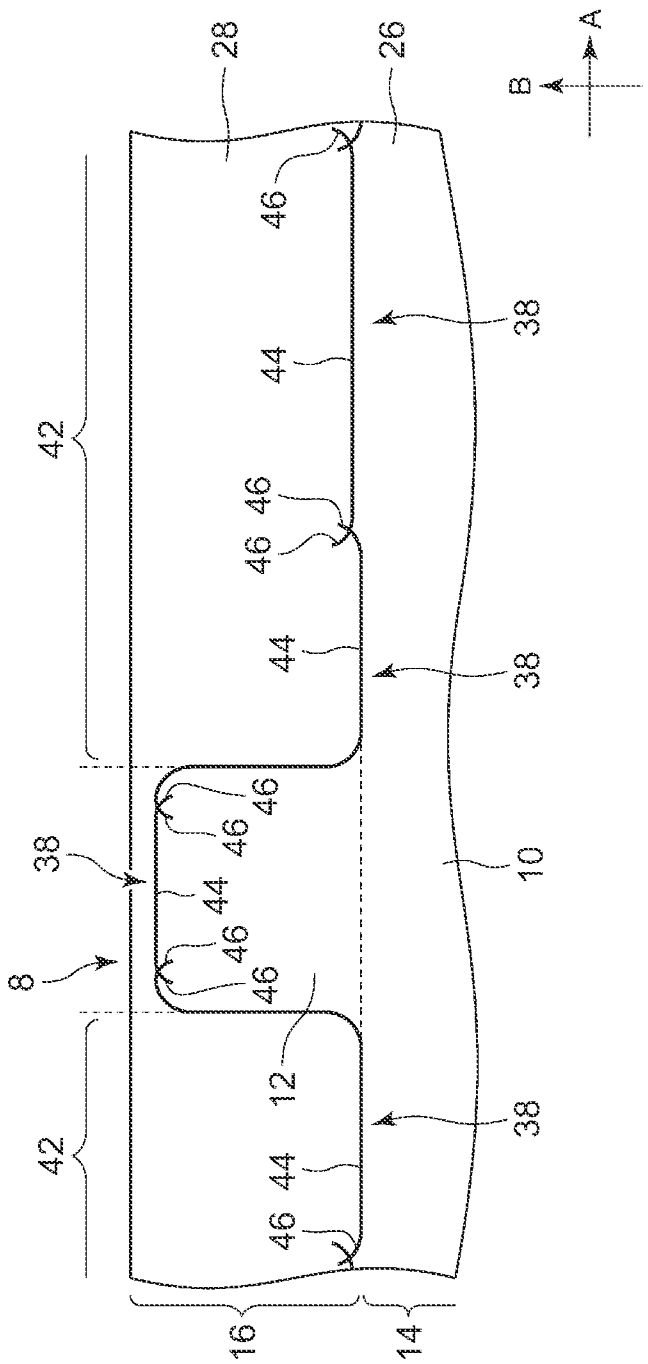
FIG. 3 is a schematic diagram showing the shape of unit cutting sections in the second embodiment.

FIG. 3 is a schematic diagram showing the shape of unit cutting sections 38 in the second embodiment. As shown in FIG. 3, a tab 12 is bordered by a plurality of unit cutting sections 38 in the present embodiment. More specifically, two substantially L-shaped unit cutting sections 38 and one linear unit cutting section 38 form the tab 12. An L-shaped unit cutting section 38 has a portion extending in the conveyance direction A and a portion extending in the width direction B, and the portion extending in the width direction B forms a side part of the tab 12. The portion extending in the conveyance direction A forms part of the connection region 42. Further, the linear unit cutting section 38 forms the top part of the tab 12 extending in the conveyance direction A.

The L-shaped unit cutting sections 38 and the linear unit cutting section 38 each have a bent section 46 at each end thereof. Further, bent sections 46 provided on the outer side in the width direction at the respective ends of the L-shaped unit cutting sections 38 intersect with the bent sections 46 of the linear unit cutting section 38, thereby causing the unit cutting sections 38 to be continuous. The bent sections 46 provided at the opposite ends of the respective L-shaped unit cutting sections 38 intersect respective bent sections 46 of linear unit cutting sections 38 forming connection regions 42.

In a unit cutting section 38 located in a connection region 42 connecting two adjacent tabs 12 in the conveyance direction A, bent sections 46 extend outward in the width direction B. This can prevent an end of the electrode plate 10 from being cut off by the bent sections 46. On the other hand, in a unit cutting section 38 located at the top part of a tab 12 in the width direction B, the bent sections 46 extend inward in the width direction B. This can avoid the waste part 28 from being cut by the bent sections 46. The avoidance of the cutting of the waste part 28 can prevent the waste part 28 from being conveyed along with the product part 26 without being separated from the product part 26. If a condition may be obtained where the waste part 28 is not cut due to a reason, for example, that the waste part 28 has a large width or thickness or is made of a strong material, then the bent sections 46 located at the top part of the tab 12 may be directed outward in the width direction B.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the above constituting elements are also valid as embodiments of the present disclosure. Hatching applied to a cross section of a drawing does not limit the material of an object to which the hatching is applied.

In each of the embodiments, the first portion is a product part 26 and the second portion is a waste part 28. However, this is non-limiting. For example, the first and second portions may each be an electrode plate 10. The continuous body 8 may be in a condition where an electrode plate 10 and a separator are stacked. Further, an uncoated part 16 may be provided on only one side of a continuous body 8.

The inventions according to the above-described embodiments may be defined by the items described in the following.

[Item 1]

A cutting method including:

conveying a continuous body (8) of a plurality of electrode plates (10); and scanning the continuous body (8) while performing intermit irradiation with laser light (L), thereby forming a plurality of unit cutting sections (38) that are continuous and dividing the continuous body (8) into a first portion and a second portion, wherein the unit cutting sections (38) have a main line section (44) extending along the boundary of the first portion and the second portion and a bent section (46) that bends and extends from an end of the main line section (44).

The invention claimed is:

1. A cutting method including:

conveying a continuous body of a plurality of electrode plates; and scanning the continuous body while performing intermit irradiation with laser light, thereby forming a plurality of unit cutting sections that are continuous and dividing the continuous body into a first portion and a second portion, wherein the unit cutting sections have a main line section extending along a boundary of the first portion and the second portion and a bent section that bends and extends from an end of the main line section, wherein the main line section is linear and extends in a first direction, wherein the bent section extends in a direction intersecting the first direction, and wherein bent sections in two adjacent unit cutting sections extend non-parallel to each other and intersect each other in a middle of respective bent sections, thereby causing the two adjacent unit cutting sections to be continuous.

* * * * *